US012491132B2

(12) United States Patent
Kim

(10) Patent No.: US 12,491,132 B2
(45) Date of Patent: Dec. 9, 2025

(54) PISTON ACUPRESSURE DEVICE FOR SPINE MASSAGE

(71) Applicant: Tae Joong Kim, Hwaseong-si (KR)

(72) Inventor: Tae Joong Kim, Hwaseong-si (KR)

( * ) Notice: Subject to any disclaimer, the term of this patent is extended or adjusted under 35 U.S.C. 154(b) by 129 days.

(21) Appl. No.: 18/270,941

(22) PCT Filed: Dec. 28, 2021

(86) PCT No.: PCT/KR2021/020003

§ 371 (c)(1),
(2) Date: Jul. 5, 2023

(87) PCT Pub. No.: WO2022/149785

PCT Pub. Date: Jul. 14, 2022

(65) Prior Publication Data

US 2024/0065936 A1 Feb. 29, 2024

(30) Foreign Application Priority Data

Jan. 8, 2021 (KR) ........................ 10-2021-0002257

(51) Int. Cl.
*A61H 39/04* (2006.01)

(52) U.S. Cl.
CPC ..... *A61H 39/04* (2013.01); *A61H 2201/0207* (2013.01)

(58) Field of Classification Search
CPC .......... A61H 39/04; A61H 9/00; A61H 9/005; A61H 9/0078
See application file for complete search history.

(56) References Cited

U.S. PATENT DOCUMENTS 11,077,012 B2 * 8/2021 Wang .................. A61H 1/0296

FOREIGN PATENT DOCUMENTS

| | | | |
|---|---|---|---|
| KR | 1020100096723 | A | 9/2010 |
| KR | 101468845 | B1 | 12/2014 |
| KR | 101561005 | B1 | 10/2015 |
| KR | 20200076013 | A | 6/2020 |
| KR | 102305466 | B1 | 9/2021 |

* cited by examiner

*Primary Examiner* — Todd J Scherbel

(74) *Attorney, Agent, or Firm* — The Roy Gross Law Firm, LLC; Roy D. Gross

(57) ABSTRACT

The present invention relates to a piston acupressure device for a spinal massage and provides an acupressure operation in an accurate position by ensuring firmly the ascending/descending operation of the piston which ascends/descends by expansion and contraction of the airbag and the movement phenomenon in the forward direction can be prevented during the ascending operation of the piston, damage, noise, and vibration caused by friction caused by parts interference caused by the unbalanced piston can be prevented in advance. Therefore, the durability for the product is increased and the reliability of the operation is ensured.

13 Claims, 10 Drawing Sheets

PISTON ACUPRESSURE DEVICE FOR SPINE MASSAGE

CROSS REFERENCE TO RELATED APPLICATIONS

This application is a National Phase of PCT Patent Application No. PCT/KR2021/020003 having International filing date of Dec. 28, 2021, which claims the benefit of priority of Korean Patent Application No. 10-2021-0002257, filed Jan. 8, 2021, the contents of which are all incorporated herein by reference in their entirety.

TECHNICAL FIELD

The present invention relates to a piston acupressure device for a spinal massage, and more particularly, to a piston acupressure device for a spinal massage which is disposed along a spine of a human body with intervals to improve the structure to increase an operation reliability of a piston which ascends and descends by an operating pressure to increase a massage effect by an acupressure operation in a correct position and suppresses a damage of the components, noises, and vibration in accordance with the unbalanced piston to ensure the reliability of the operation.

BACKGROUND ART

One of diseases which are frequently occur due to the lack of exercise and increases of people who sit and work in the same posture for a long time is disc. Specifically, in recent years, as the time of using various mobile devices, such as laptops, tablets, and smartphones increases regardless of gender and age, the number of people suffering from diseases of cervical vertebra which is a part between the skull and the thoracic vertebrae, among parts which configure the spine, is rapidly increasing. That is, the cervical vertebra is a part commonly referred to as a neck bone, among vertebrae of our body and is composed of seven spinal segments. A hole through which the cervical artery passes is formed in a transverse process of each cervical vertebrae and veins and the brachial plexus are located therearound. A lower part of the cervical vertebrae is connected to the body and an upper part is connected to the head so that it can be said that the cervical vertebrae is an important part of the body. Like the thoracic and lumbar vertebrae, the cervical vertebrae are affected by the person's posture and have various musculoskeletal disorders caused by this. As an example, the same cervical disc herniation as other spinal discs may occur. A sprain occurs in the ligaments that support the cervical vertebra from the back. Stiffness is generated in the cervical muscles due to various causes to also compress the nerves and as a result, various musculoskeletal disorders, such as headache, neck pain, and shoulder pain may occur.

Generally, for the treatment of back pain or shoulder pain, methods for treating or alleviating pathological conditions by physical therapy which strengths muscles or stimulating acupuncture points to facilitate blood circulation are widely practiced. In addition, in the case of spinal diseases, a gap between vertebrae is widened and the pressed intervertebral disc is relaxed to correct the body shape by the relaxing operation. That is, the acupressure or massage is a kind of manual procedure which gives a mechanical stimulation to the skin mainly using the hands by a predetermined method to cause a bio reaction to correct the modulation of the body to treat the disease and improve the health. Acupressure/massage promotes blood or lymph circulation, boosts metabolism, enhances tissue nutrition, excretes wastes, and enhances resistance. The touch pressure stimulation simulates nerves and acts as an analgesic to promote the recovery of paralyzed nerves and correct the modulation of the function of the internal organs.

However, since most of the acupressure and massage cannot be performed by the person who receive the treatment alone. Therefore, there is a problem in that the effect is not constant because it is performed by relying on the force of a person as well as the inconvenience of having to receive help from others. In order to solve the problems, in the related art, various types of acupressure and massage machines which can receive the acupressure and massage by themselves have been developed and used. A vibration massage machine which uses a driving source to vibrate an acupressure sphere and a pneumatic massage machine which uses a pressure of air are the mainstream. However, the vibration massage machine repeatedly hits (taps) a part of the body so that it has disadvantages of not only having a low acupressure effect, but also causing a secondary pain by hitting. Further, in order to properly transmit the vibration of the acupressure sphere to the device, the acupressure sphere needs to press the body part with a predetermined force, which is not only inconvenient in use, but also difficult to use continuously due to the force.

In the case of the pneumatic pressure massager, pressure is repeatedly applied to a part of the body by injecting and discharging air into a cuff designed to cover a body part such as an arm, leg or waist of the body. Therefore, since the pneumatic pressure massager simply massages a part of the body, it is difficult to expect acupressure effects such as stimulation of acupuncture points, and it is cumbersome to use because it must be worn on the arms, legs, or waist of the body. Among these pneumatic pressure massagers, there is a treatment machine equipped with a belt type cuff that expands up and down by the action of the pneumatic pressure to exert traction force. However, it is also inconvenient to use because it must be worn on the neck or waist. Further, when excessive pneumatic pressure is applied, it is difficult not only to promptly respond and but also to obtain a sufficient traction effect so that it is disadvantageous in that the treatment effect is low.

Specifically, as a related art to improve the flow of cerebrospinal fluid by compressing the suboccipital muscle or its surroundings while relaxing the cervical vertebra, in Korean Registered Patent Publication No. 10-1665115 (Oct. 12, 2016), a functional cervical vertebra pillow has been proposed. Specifically, a technical for a functional cervical vertebra pillow which maintains the cervical vertebrae in a C shape and applies the acupressure the cervical vertebra No. 1 when a user lies down to relax the tension and the pain in the neck muscle and allows the patient to fall asleep in a comfortable and correct posture without straining the shoulder when the user lies on the side has been described. The related art is configured by applying the acupressure the cervical vertebra No. 1 while maintaining the curvature of the cervical vertebra to apply the acupressure to the suboccipital muscle, which is similar to the present invention. However, according to the related art, only the curvature of the cervical vertebra is maintained, but a function of relaxing the cervical vertebrae and exercising the cervical vertebrae muscles has not been included. Further, a component for compressing the ventricles along with the suboccipital muscles is not included. Therefore, the function of relaxing the cervical vertebrae and facilitating the flow of cerebrospinal fluid is not included.

As another related art, in Korean Registered Patent Publication No. 10-1077885 (Oct. 31, 2011), a myofascial relaxer for physical therapy has been disclosed. To be more specific, the myofascial relaxer for physical therapy includes a main body which is horizontally placed on the floor, an occipital bone acupressure unit which protrudes from one side of the main body to support and apply an acupressure to the occipital bone, a lower occipital part support unit which protrudes to be higher than the occipital bone acupressure unit in a front position of the occipital bone acupressure unit of the main body to support and apply acupressure to the lower occipital part, and an upper thoracic vertebrae acupressure unit which protrudes in a front position of the lower occipital part support unit to apply the acupressure to the upper thoracic vertebra while supporting the back of the neck so as not to push the main body back. However, it is just a structure which compresses the suboccipital muscle or its surroundings using the plurality of protrusions so that it is difficult to expect the treatment effect.

As a still another related art, in Korean Unexamined Patent Application Publication No. 10-2010-0113330, a finger presser machinery using an airbag has been disclosed. In claim 1, a configuration of a finger presser machinery using an airbag in which an airbag is placed under an airbag compression plate, a plate with an acupressure roads on the bottom is located below the airbag, a support is fixed to four ears of the plate so that the plate with the acupressure rods moves up and down by expansion and contraction of the airbag in a state in which the support is inserted into holes of four ears of the airbag compression plate to compress and release the acupuncture points of the body below the acupressure rods to apply the acupressure to the acupuncture points is disclosed.

However, the finger presser machinery using an airbag according to the related art has a structure in which a plate with an acupressure rods fitted into the holes formed in four corners of the airbag compression plate through the support with the airbag therebetween ascends and descends so that it is structurally complicated to be placed in parallel along a series of vertebrae. Specifically, according to the related art, the airbag is configured between four supports so that the airbag is not firmly supported, but horizontally moves, during the expansion and contraction process. Therefore, three was a problem in that the inflation pressure of the airbag is not accurately applied to a center between the airbag compression plate and the plate with the acupressure rod. That is, the airbag inflates in an oval shape, like a balloon, so that only when a position of the airbag is fixed to the center of the airbag compression plate and the plate with an acupressure rod, the plate with an acupressure rod may have up and down displacement by the expansion and contraction operation. However, the airbag according to the related art is not confined so that the airbag easily moves in the horizontal direction during the expansion and contraction operation. Consequently, the expansion force acts at an eccentric position with respect to the plate with an acupressure rod so that the plate with the acupressure rod is not leveled, but is inclined. Therefore, in the inclined state of the plate with the acupressure rod, four supports and holes of the airbag compressions through which the supports pass cannot maintain an accurate position, but causes eccentric friction so that it is difficult to smoothly ascend and descend the plate due to the noise and frictional interference between parts.

As another related art, in Korean Registered Patent Publication No. 10-1468845, an air pressure massage device with a physical therapy function has been disclosed to propose a configuration in which a piston acupressure plate ascends and descends in a guide cylinder during the expansion of the airbag. However, the guide cylinder is completely closed excluding the top surface so that the airbag and the piston acupressure plate need to be assembled. Therefore, the assembling property is bad. Since the airbag is provided in a tubular shape and has a port (injection nozzle) for air injection on the side, it is very difficult to manufacture. Further, when the airbag is contracted, upper and lower surfaces of the airbag cannot be completely closed due to the air-injecting port so that consequently, there are problems in that the acupressure plate is not completely lowered due to the volume of the port and the port is jointed to the airbag by thermal fusion, but the fatigue is accumulated in the joint part to be easily damaged.

Further, the airbag includes a port for injecting and discharging the air on one side surface and the air is injected through the port so that the airbag causes a local expansion phenomenon in which expansion occurs from a portion close to the port. That is, the airbag of the related art does not uniformly expand due to the structure, but locally expands so that a uniform expansion pressure is not applied to the entire bottom surface of the guide cylinder, but a local expansion pressure acts to inflate any one part of the airbag. Therefore, the piston acupressure plate cannot maintain a horizontal balance, but is inclined to any one of the left and right sides so that consequently, there is a negative effect that the left and right surfaces of the piston acupressure plate are frictionally contacted with an inner wall surface of the guide cylinder to ascend and descend.

Accordingly, the airbag needs to expand by the normal air injection to ascend with respect to the piston acupressure plate. However, the piston acupressure plate is in frictionally contact with the guide cylinder so that excessive air needs to be injected. Therefore, the durability of the airbag is degraded and noises and vibrations are caused due to the friction of the piston acupressure plate and the guide cylinder to not only cause the complains of consumers, but also cause the damage of the components due to the repeated frictions.

Further, the piston acupressure plate which has been moved upward in a state inclined to any one side is not balanced to the left and right during the descending, but descends in a leaned to any one side so that the problems generated during the ascending is reproduced as it is. Above all, there was a problem in that complaints about the product were aggravated as the piston acupressure plate ascends without accurately maintaining the left and right balance to cause a local pain in the user's body part.

As still another related art, in Korean Registered Patent Publication No. 10-1561005, a massage device with a physical therapy function has been disclosed. In the massage device with the physical therapy function according to the related art, configurations of acupressure pieces which are provided in a laryngeal seating unit to ascent by supplying and discharging an air pressure, a cylinder in which a lower end of the acupressure piece is accommodated, and an ascending airbag which is provided in the cylinder to be supplied with an air pressure to expand a volume have been disclosed. However, also in the massage device according to the related art, when an air is supplied to the ascending airbag, a local expansion phenomenon in which a part connected to a nozzle through which the air is injected expands occurs. Consequently, due to the local expansion, the acupressure piece ascends in an inclined state to any one side of the left side and the right side without maintaining a horizontal state. Therefore, the acupressure piece ascends in a frictionally contact with one inner wall surface of the cylinder so that there are serious problems of not only causing noises and vibrations, but also causing damages of the components due to the frictions. Further, the massage device according to the related art performs an ascending operation in a state in which a lower end of the acupressure piece is inserted into the cylinder so that as a result, the ascending operation is performed in a state in which only the lower end of the acupressure piece is supported to the cylinder, but the upper end is not supported. As a result, when the airbag expands or contracts, there is a problem in that the upper end of the acupressure piece easily moves in the horizontal direction to severely shake. By doing this, the upper end of the acupressure piece ascends and descends while severely moving so that it is not possible to perform an effective acupressure action in an accurate position of the body of the user. Further, it causes a serious problem of increasing the complaint for the product by causing a pain due to the positional displacement of the acupressure piece.

DISCLOSURE

Technical Problem

According to the present invention, in order to solve the problem of the related art, an object of the present invention is to provide a piston acupressure device for a spinal massage which stably ascends and descends a piston without shaking in the ascending and descending direction to increase a massage effect by means of an acupressure operation in an accurate position and prevents the damage of the component and noise and vibration generated due to the unbalance of the piston in advance to increase the reliability of the operation and the satisfaction for the product.

Further, an object of the present invention is to provide a piston acupressure device for a spinal massage which performs the acupressure in an accurate position by simplifying a structure to increase the reliability of the operation and adjusting an interval of cylinder housings in accordance with the interval of spines according to a height of the user.

Further, an object of the present invention is to provide a piston acupressure device for a spinal massage which increases a therapy effect by vibration and heating actions as well as the acupressure action in accordance with the ascending of the piston with a configuration including a vibration motor or a thermal heater in an acupressure protrusion.

Technical Solution

In other to achieve the above object, according to an exemplary embodiment of the present invention, a piston acupressure device for a spinal massage includes a cylinder housing which is configured by a chamber with an open top surface to accommodate an airbag therein and a cover plate which forms a slit in a width direction by shielding a top surface of the chamber; a piston which is configured by an ascending/descending plate unit which is located in the chamber to pass through the slit to be ascended or descended by an airbag and a pressurization plate unit which extends to an upper portion of the ascending/descending plate unit to pressurize the spine through the top surface when ascending; a top housing which has an end connected to the cylinder housing to guide and support the pressurization plate unit of the piston and includes a guide surface which is slidably surface-contact even in a state in which an edge of an entry hole through which the pressurization plate unit passes vertically extends so that the pressurization plate unit fully descends; a balance spring which has one end supported by the cylinder housing or a top housing and the other end supported by one side of the piston to apply a downward elastic force; a driver which is configured by a valve which is connected to the airbag to regulate the supplying and discharging of the air, a pump which generates a pneumatic pressure, and a controller which controls the valve and the pump.

As a desirable feature of the present invention, the cylinder housing is configured by a body in which a trapezoidal chamber in which both side surfaces are open and a width is upwardly increased; and a cover plate which is provided to cover the open top surface of the body and forms an assembly hole to insert the ascending/descending plate unit from the side surface and is connected to the assembly groove to allow the ascending/descending plate unit to pass through.

As another desirable feature of the present invention, the cylinder housing has a cylindrical shape with an open upper surface, and has 2 to 7 chambers partitioned by partition walls therein and is configured by a body having a trapezoidal chamber in which both side surfaces are open and a width is upwardly increased; an assembly hone which is provided on the open top surface of the body and inserts the piston in an intersecting direction with an adjacent chamber from a side surface; and a cover plate which is connected to the assembly hole to form a slit which is a hole through which the ascending/descending plate unit passes.

As another desirable feature of the present invention, the balance spring which has one end caught to a center portion of a side lode of the ascending/descending plate unit and both ends which are upwardly curved with respect to one end to be supported by a bottom surface of the cover plate to apply the downward elastic force to the ascending piston and is configured by an insertion groove having a size to allow the ascending/descending plate unit to be inserted and pass therethrough, one pair of elastic displacement units with a U shape which is disposed in the front and rear sides with respect to the insertion groove, and a connection unit which connects both ends of the elastic displacement units to form a closed curve, is any one of a leaf spring or a steel wire spring formed by bending the steel wire.

As another desirable feature of the present invention, the balance spring has one end caught to a center portion of a side lower portion of the pressurization plate unit and both ends which are upwardly curved with respect to one end to be supported by a bottom surface of the top housing to apply the downward elastic force to the ascending piston and is configured by an insertion groove having a size to allow the pressurization plate unit to be inserted and pass therethrough, one pair of elastic displacement units with a U shape which is disposed in the front and rear sides with respect to the insertion groove, and a connection unit which connects both ends of the elastic displacement units to form a closed curve, is any one of a leaf spring or a steel wire spring formed by bending the steel wire.

As another desirable feature of the present invention, the balance spring is a plurality of coil springs which has one end supported at one side of the ascending plate unit or the descending plate unit and the other end supported at one side of the bottom surface of the chamber or the top housing to apply a downward support force to the piston.

As another desirable feature of the present invention, the cylinder housing includes a body having a trapezoidal chamber in which a top surface and both side surfaces are open and a width is increased from a lower portion to an upper portion; a cover plate which is provided to shield the open top surface of the body and forms a slit which has a width smaller than the chamber in a width direction and allows the ascending/descending plate unit to move in and out; a rail which protrudes on a bottom surface of the cover plate with an interval to allow a movement in a spring displacement direction, but suppress the movement in the width direction by allowing both ends of a U shaped balance spring in which a center portion is concavely curved to be slidably fitted therebetween.

As another desirable feature of the present invention, the airbag is configured by an expansion bag unit which is in contact with the bottom surface of the ascending/descending plate unit to apply an expansion force; and a reinforcement bag unit which is connected to one side of the expansion bag unit to be folded to be connected to a nozzle to inject or discharge an air from and to the outside.

As another desirable feature of the present invention, the controller includes a pressure detection sensor which detects an expansion pressure of the airbag; and an expansion control unit which is connected to the pressure detection sensor to compare a predetermined set value to apply a control signal to a pump and a valve to maintain within the set value range.

As another desirable feature of the present invention, the ascending/descending plate unit is configured by a flat surface which forms a bottom surface to be flat to be surface-contact with the top surface of the airbag, a lower frame which extends to an upper portion from the flat surface with a reduced thickness, and a hook which protrudes from a center lower portion of the front and rear surfaces of the lower frame to allow a center portion of the balance spring to be caught, the pressurization plate unit is configured by an upper frame which is located above the cover plate with an expanded volume above the lower frame and forms one or more guide rails in a direction perpendicular to the front and rear surfaces to be slidably fitted into the guide hole corresponding to the top housing, a case which covers an outside of the upper frame and has a top surface to form a spine seating curve in which a center portion is concavely curved to seat the spine of the human body, and an acupressure plate which forms a plurality of acupressure protrusions which is fitted to the upper portion of the case or integrally protrudes by the insert injection to apply acupressure to both muscles of the spine.

As another desirable feature of the present invention, the acupressure protrusion is configured to include any one or both a vibration motor which is supplied with a power to generate a vibration or a thermal heater which is supplied with a power to generate heat.

As another desirable feature of the present invention, a plurality of cylinder housings is configured to two or seven to adjust an interval therebetween and the cylinder housings are configured by a slide tray which guides the movement to a direction for adjusting an interval in a state in which the plurality of cylinder housings is disposed in parallel; and an adjustment screw which is inserted and passes into one end of the cylinder housing by screw-fastening to be screwed to each cylinder housing with a pitch which is gradually increased or decreased.

As another desirable feature of the present invention, a plurality of cylinder housings is configured to two to ten to adjust an interval therebetween and is configured by a guide tray in which the cylinder housing is slidably seated and a fixing screw which is screwed to one side of the guide tray to selectively pressurize the cylinder housing through the end to restrain the position.

Advantageous Effects

According to the present invention, in the piston acupressure device for a spinal massage, a piston which ascends and descends by the expansion and contraction of the airbag ensures the firm ascending and descending operation without being shaken, by the support structures provided on and below the piston so that the massage effect may be increased by the acupressure action in the accurate position.

As the movement phenomenon in the forward direction can be prevented during the ascending operation of the piston, damage, noise, and vibration caused by friction caused by parts interference caused by the unbalanced piston can be prevented in advance. Therefore, the durability for the product is increased and the reliability of the operation is ensured so that useful effects which can greatly increase the consumer's satisfaction with the product can be expected.

Further, the accurate operation of the piston can be ensured so that the accurate and effective acupressure on the cervical, thoracic, and lumbar vertebrae that make up the spine is possible so that smooth blood circulation and activation are induced by relaxing and strengthening the vertebral body and surrounding muscles between them to increase the therapeutic effect by the acupressure which promotes the metabolism.

Further, according to the present invention, the user receives the acupressure in a comfortable lying position without restraining the user's body part so that there is no risk of safety accidents due to malfunction of the machine, and it is relatively safe from the risk of pain and injury due to excessive physical force, that is, acupressure.

Further, the present invention has a simple structure and a compact volume so that it is convenient to move and store so that it has the advantage of minimizing the user's psychological burden on existing spine therapy devices and enabling use in a stable and comfortable posture.

Further, the present invention has an advantage of increasing the acupressure effect by adjusting the distance between cylinder housings by disposing a plurality of cylinder housings so that the user can receive acupressure according to the distance between the vertebrae according to the user's height.

In the present invention, a vibration motor or a thermal heater are provided in the acupressure protrusion, it is expected that the effect of enhancing the treatment effect through this simultaneous application of vibration or thermal action along with the pressurized acupressure force applied when the piston ascends.

| | |
|---|---|
| 10: Cylinder housing | 11: Body |
| 12: Chamber | 13: Cover plate |
| 13a: Slit | 13b: Assembly hole |
| 14: Rail | 15: Airbag |
| 15a: Expansion back unit | 15b: Reinforcement back unit |
| 15c: Nozzle | 20: Piston |
| 21: Ascending plate unit | 23: Pressurizing plate unit |
| 30: Top housing | 31: Seating unit |
| 31a: Entry hole | 32: Guide surface |
| 40: Balance spring | 41: Elastic displacement unit |
| 42: Insertion groove | 43: Connection unit |
| 50: Driver | 51: Valve |
| 53: Pump | 55: Controller |

MODE FOR CARRYING OUT THE INVENTION

Hereinafter, a configuration and an operation of the exemplary embodiment of the present invention will be described in detail with reference to the accompanying drawings. However, it is not intended to limit the present invention to the specific embodiments, and it will be appreciated that the present invention includes all modifications, equivalences, or substitutions included in the spirit and the technical scope of the present invention.

Figure 1:
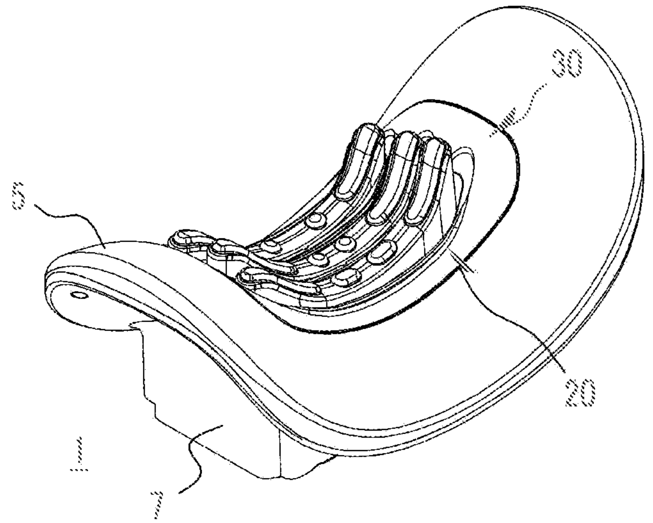
FIG. 1 is a perspective view illustrating a piston acupressure device for a spinal massage according to the present invention.

FIG. 1 is a perspective view illustrating a piston acupressure device for a spinal massage according to the present invention. In the drawings, as an outer body, a top housing 30 having a gentle curvature so that when a user lies, a spinal part of the human body is seated and a piston 20 which is supported by the top housing 30 through an upper end to perform the acupressure action on the spine of the user by the ascending and descending operation are illustrated. A piston acupressure device 1 for a spinal massage with a configuration in which the top housing 30 and the piston 20 are coupled to a top case 5 and a bottom case 7 which form an outer body is illustrated.

Figure 2:
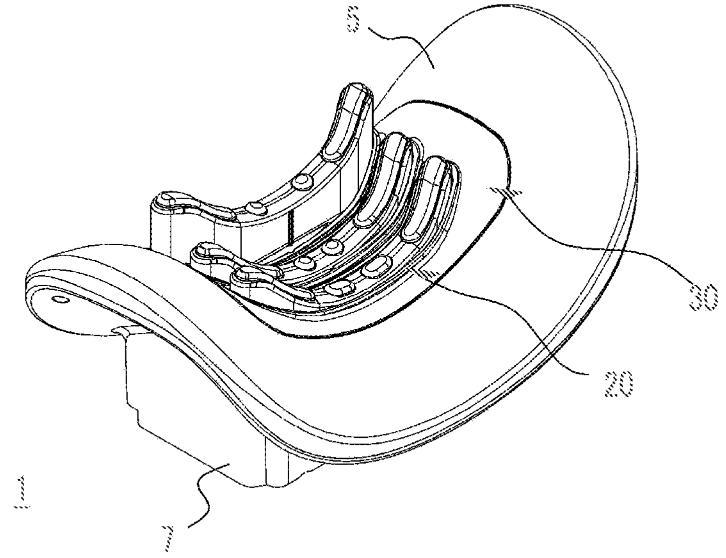
FIG. 2 is an exemplary view for explaining an operation of FIG. 1.

FIG. 2 is an exemplary view for explaining an operation of FIG. 1. In the drawing, a piston 20 which is assembled in the top case 5 and the bottom case 7 which form an outer body to ascend and descend and a top housing which guides and supports an upper portion of the piston 20 to prevent the movement are illustrated and a piston acupressure device for a spinal massage with a configuration in which a plurality of pistons 20 is provided with an interval to selectively ascend and descend to pressurize and support the surroundings of the spine of the user is illustrated.

Figure 3:
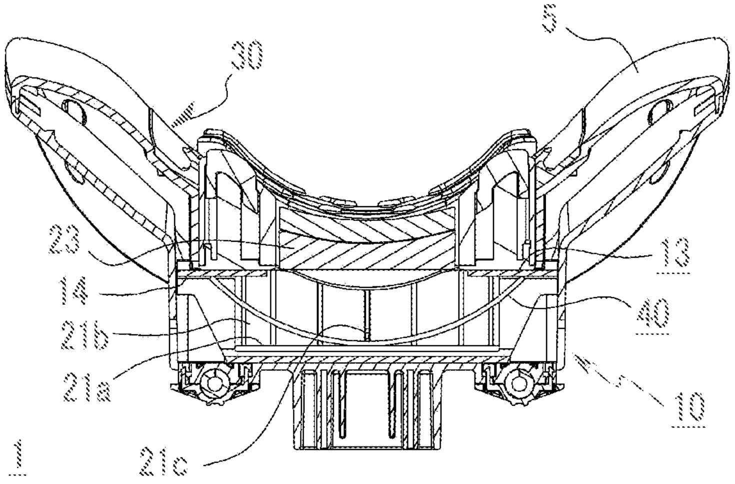
FIG. 3 is a cross-sectional view for explaining an internal configuration of FIG. 1.

FIG. 3 is a cross-sectional view for explaining an internal configuration of a piston acupressure device for a spinal massage illustrated in FIG. 1. In the drawing, a piston acupressure device 1 for a spinal massage including a cylinder housing 10 in which a chamber 12 for accommodating the airbag 15, an ascending and descending plate unit 21 which is inserted into the chamber 12 of the cylinder housing 10 to ascend and descend in association with the expansion and contraction of the airbag 15, a piston 20 configured by an ascending/descending plate unit 21 which is inserted into the chamber 12 of the cylinder housing 10 to ascend and descend in association with the expansion and contraction of the airbag 15 and a pressurizing plate unit 23 including an acupressure plate 23*c* which extends perpendicular to an upper portion of the ascending/descending plate unit 21 to apply a pressurization support force to the spine of the user, a balance spring 40 which has one end caught to a hook 21*c* provided at one side of the ascending/ascending plate 21 which configures the piston 20 and both ends upwardly curved to be caught in the bottom surface of the chamber 12 to apply a descending elastic support force to the piston 20, a top housing 30 which is a fixing member supporting in a slide-surface contact even in the maximum descending position of the operation plate 41 which is an upper component of the piston 20 to prevent the flow during the ascending and is connected to and support the cylinder housing 10, and a top case 5 which supports the top housing 30 is illustrated.

Figure 4:
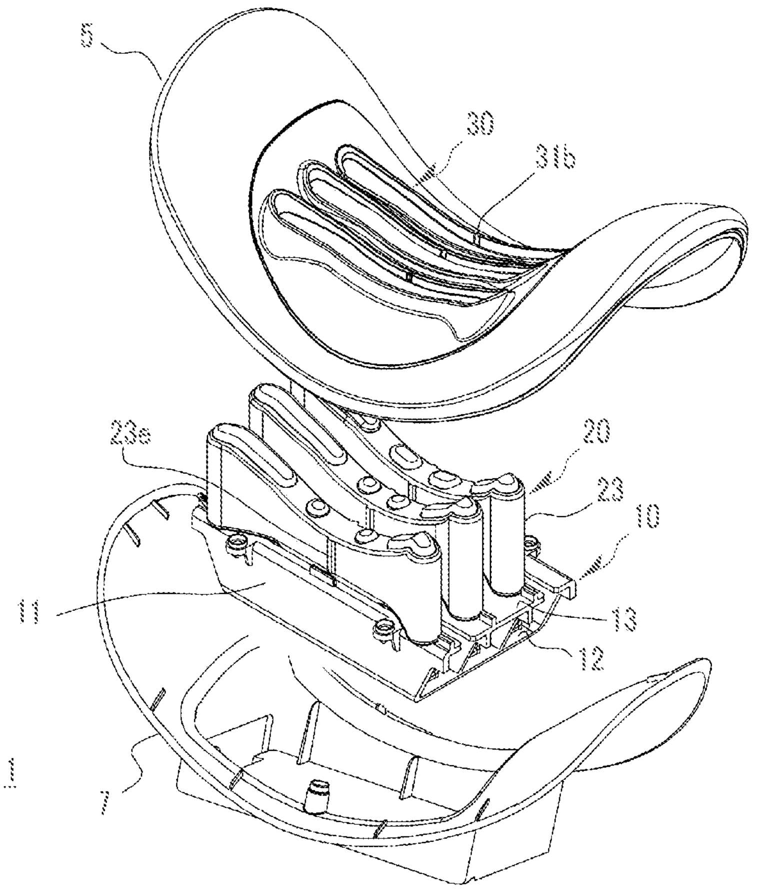
FIG. 4 is an exploded perspective view for explaining a configuration of FIG. 1.

FIG. 4 is an exploded perspective view for explaining a configuration of FIG. 1. In the drawing, a piston acupressure device 1 for a spinal massage which is configured by a top housing 30 in which an entry hole 31*a* which is a rectangular hole to allow the piston 20 to go and out from the uppermost side, a piston 20 which is disposed at the lower side of the top housing 30 to selectively ascend through the entry hole 31*a* to appear and disappear, and a cylinder housing 10 including a chamber 12 in which an airbag 15 which applies the ascending and descending force to the ascending/ascending plate unit 21 which configures the piston 20 is illustrated. The cylinder housing 10 is assembled with a bottom case 7 which is integrally assembled with the top case 5. Here, the top case 5 and the bottom case 7 form an outer body of the massage device and in the present invention, for the convenience, a top case 5 and a bottom case 7 applied to the massage device for a cervical vertebra illustrated in FIG. 21 are borrowed.

Figure 5:
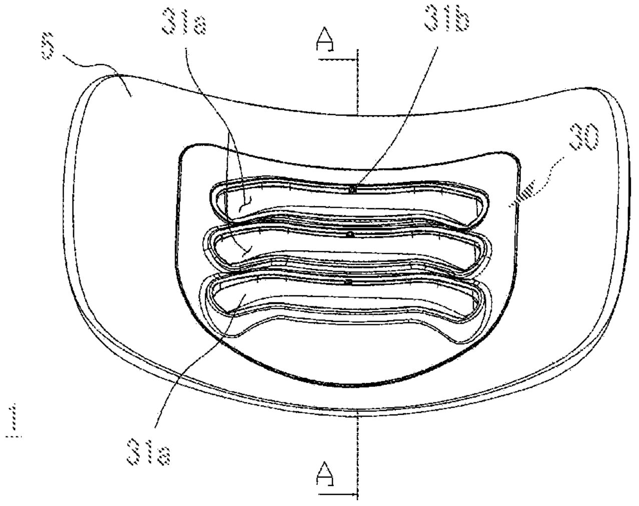
FIG. 5 is a plan view illustrating a top housing assembly illustrated in FIG. 1.
Figure 6:
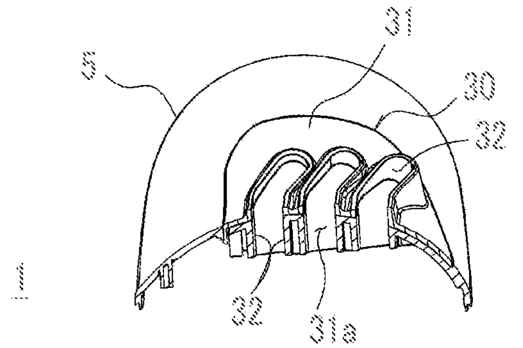
FIG. 6 is a cross-sectional view taken along the line A-A' of FIG. 5.

FIG. 5 is a plan view illustrating a top housing assembly illustrated in FIG. 1 and FIG. 6 is a cross-sectional view taken along the line A-A' of FIG. 5. In the drawing, a seating unit 31 having three entry holes 31*a* formed with an interval is illustrated. Each entry hole 31*a* vertically extends. A top housing 30 having a guide surface 32 which is slidably contact with an outer surface of the pressurization plate unit 23 which configures the piston 20 to prevent the movement and ensure a stable ascending/descending operation is illustrated. At this time, the seating unit 31 is provided to have a gentle curvature so that the plurality of pistons 20 is disposed along the spine of the user's body so that the guide surface 32 may be downwardly formed or upwardly protrude with respect to the exist hole 31*a* formed in the seating unit 31.

Figure 7:
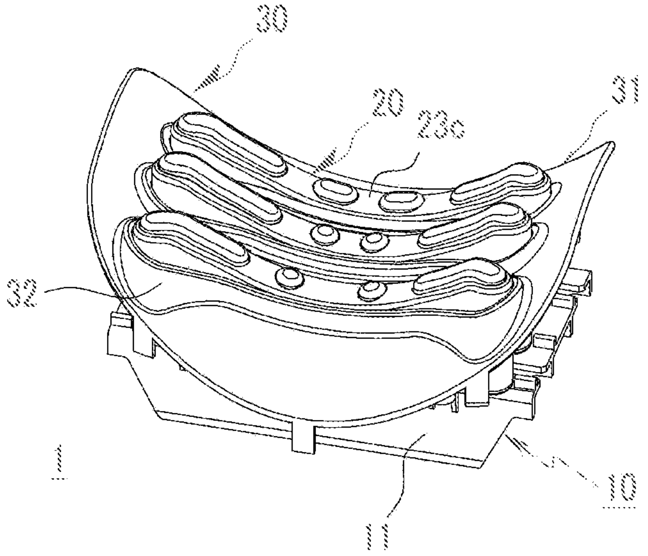
FIG. 7 is a perspective view illustrating a main configuration of the present invention.
Figure 8:
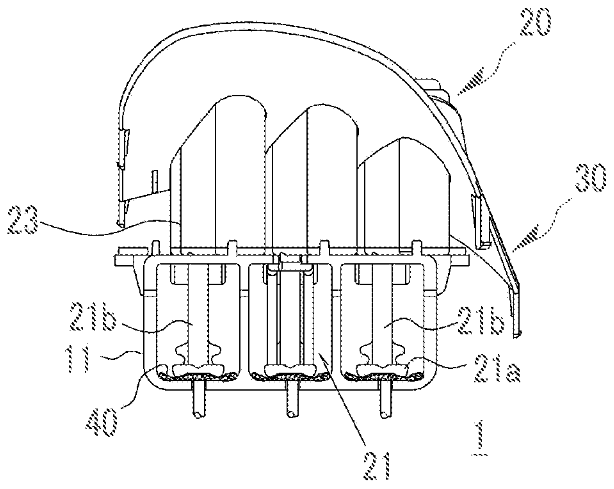
FIG. 8 is a view seen from a side surface of FIG. 7.

FIG. 7 is a perspective view illustrating a main configuration of a piston acupressure device for a spinal massage according to the present invention. FIG. 8 is a side view of FIG. 7. In the drawing, a piston acupressure device 1 for a spinal massage configured by the top housing 30 including the seating unit 31 formed with a plurality of entry holes (no reference numeral) with an interval, a cylinder housing 10 which is disposed below the top housing 30 to be integrally coupled with the top housing 30 or restrained by not-illustrated components and includes a body 11 provided with a plurality of chambers 12 for accommodating an airbag 15 which is supplied with an pneumatic pressure to expand or contact a volume, and a piston 20 configured by the pressurization plate unit 23 is illustrated. The ascending/descending plate unit 21 is accommodated in the chamber 12 of the cylinder housing 10 to be applied with the ascending/descending force by the airbag 15 and an upper portion of the pressurization plate unit 23 passes through the entry hole 31*a* of the top housing 30 to selectively ascend or descend to apply the pressurization support force to the body part of the user.

Figure 9:
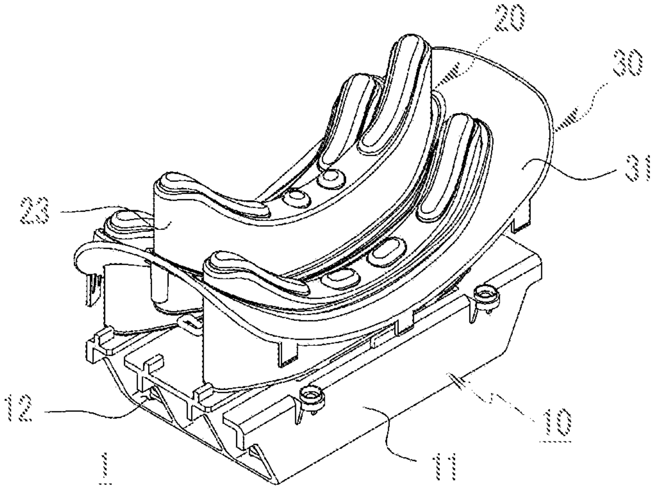
FIG. 9 is a perspective view for explaining an operation example of FIG. 7.
Figure 10:
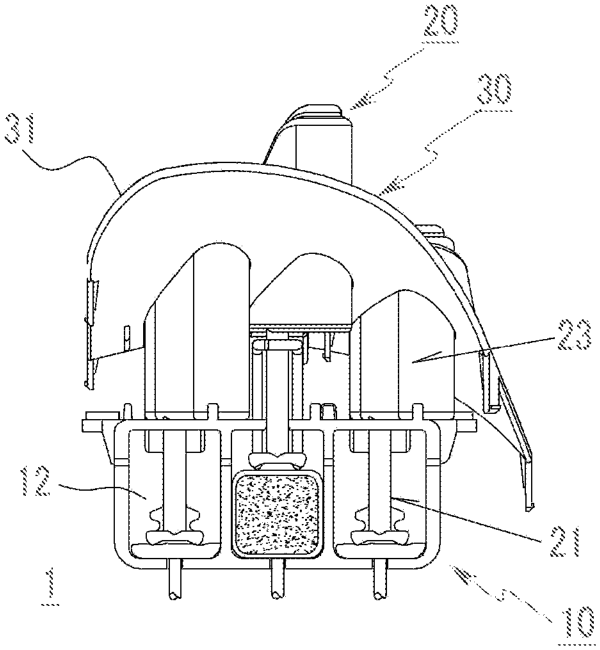
FIG. 10 is a view seen from a side surface of FIG. 9.

FIG. 9 is a perspective view for explaining an operation example of FIG. 7 and FIG. 10 is a side view of FIG. 9. In the drawing, a center piston 20 among three pistons upwardly moves. Both pistons 20 in which the airbag 15 does not expand maintain a descending state and the center piston 20 in which the airbag 15 expands upwardly moves. At this time, the piston 20 is configured by the ascending/descending plate unit 21 which is disposed above the airbag 15 to interwork with expansion and contraction and the pressurization plate unit 23 which upwardly extends to the ascending/descending plate unit 21 to apply a pressurization support force to the body part of the user. The ascending/descending plate unit 21 of the piston 20 is accommodated in the cylinder housing 10 which configures a plurality of chambers 12 divided into partitions to perform the ascending/descending operation in association with the airbag 15.

Figure 11:
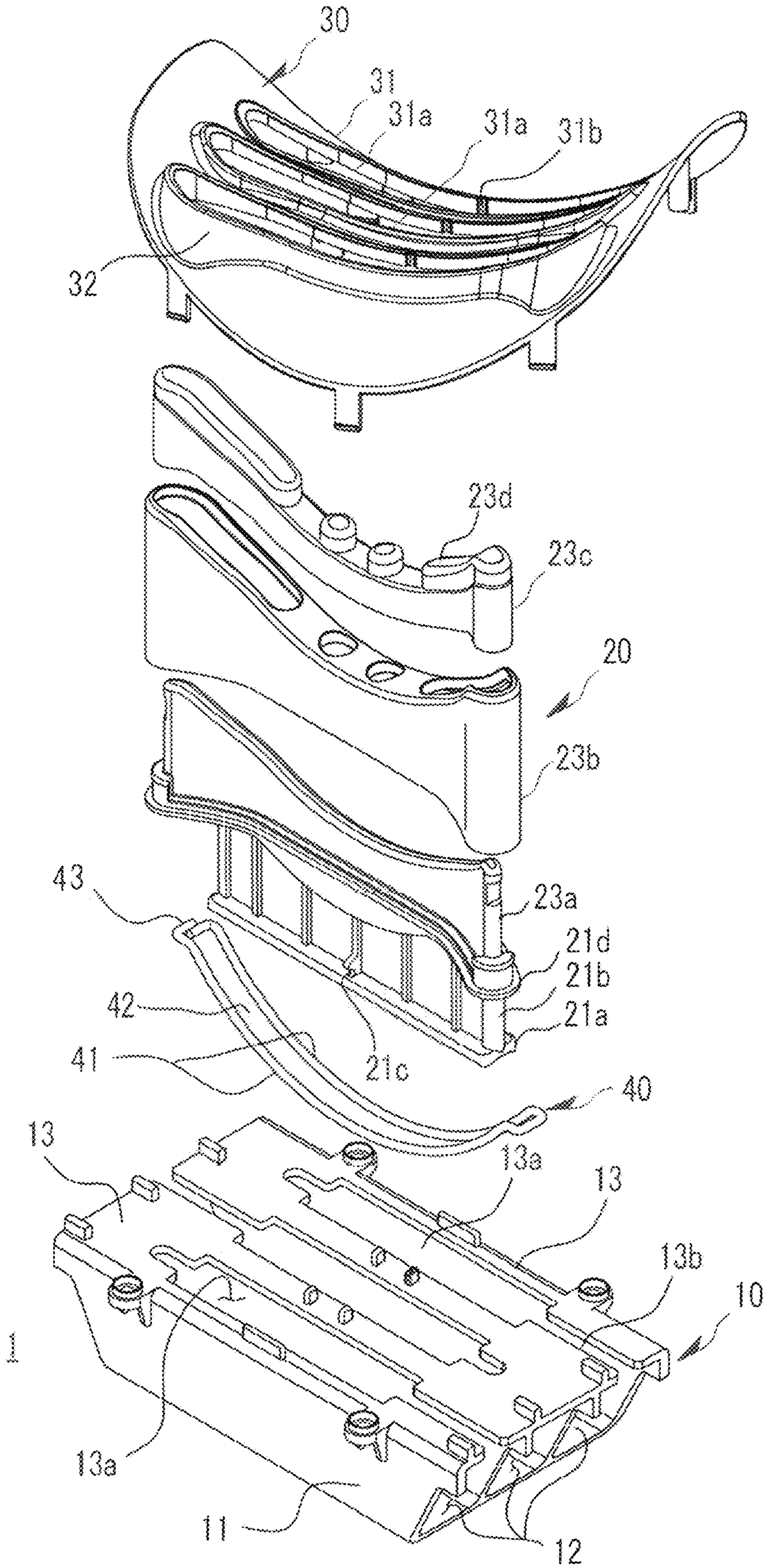
FIG. 11 is an exploded perspective view for explaining a configuration of FIG. 7.

FIG. 11 is an exploded perspective view for explaining a configuration of FIG. 7. With respect to the drawing, the top housing 30, the piston 20, the balance spring 40, and the cylinder housing 10 are disposed in this order from the top. The top housing 30 is assembled in the top case which forms an outer body and includes the entry hole 31*a* through which the piston 20 moves. The guide surface 32 extends vertically along the edge of the entry hole 31*a* to be slidably contact with the side surface of the pressurization plate unit 23 of the piston 20 to guide to prevent the movement. A guide rail 23*e* longitudinally protrudes in a direction perpendicular to the side surface of the pressurization plate unit 23 of the piston 20 and the guide groove 31*b* is vertically formed along the guide surface 32. The guide rail 23*e* is fitted into the guide groove 31*b* to induce the stable displacement in the vertical direction.

Further, the piston 20 is configured by the ascending/descending plate unit 21 and the pressurization plate unit 23. The ascending/descending plate unit 21 is configured by a flat surface 21*a*, a lower frame 21*b*, and a hook 21*c*. The flat surface 21*a* is formed to have a flat bottom surface to be in surface contact with the top surface of the airbag 15. The lower frame 21*b* vertically extends with a reduced thickness on the flat surface 21*a*. The hook 21*c* protrudes from one of center lower portion of the front and rear surfaces of the lower frame 21*b* with respect to the drawing so that a center portion of the balance spring 40 is caught thereto. The pressurization plate unit 23 is configured by an upper frame 23*a*, a case 23*b*, and an acupressure plate 23*c*. The upper frame 23*a* is located above the cover plate 13 with an expanded volume above the lower frame 21*b*. The case 23*b* is a member enclosing an outside of the upper frame 23*a* and forms a seating curve on the upper surface with a curved groove shape in which a center portion is recessed so that the human spine is seated. The acupressure plate 23*c* is provided above the case 23*c* to form a plurality of acupressure protrusions 23*d* which applies the acupressure to both muscles of the spine.

The balance spring 40 disposed below the piston 20 is configured by an insertion groove 42 having a size to allow the ascending/descending plate unit 21 to be inserted and pass through, one pair of elastic displacement units 41 which is disposed on the front and rear sides of the insertion groove 42 and has a concave center portion, and both ends upwardly bent, and a connection unit 43 which connects both ends of one pair of elastic displacement units 41 to form a closed curve. In the exemplary embodiment, a steel wire spring formed by bending the steel wire is used.

Finally, the cylinder housing 10 is configured by a body 11 and a cover plate 13. The body 11 is divided into partitions to form a plurality of chambers 12 having a trapezoidal shape whose width is upwardly increased. The cover plate 13 includes an assembly hole 13*b* which is formed to shield an open top surface of the body 11 and is fitted with the ascending/descending plate unit 21 of the piston 20 through a side surface and a slit 13*a* which is connected to the assembly hole 13*b* through which the ascending/descending plate unit 21 passes.

Figure 12:
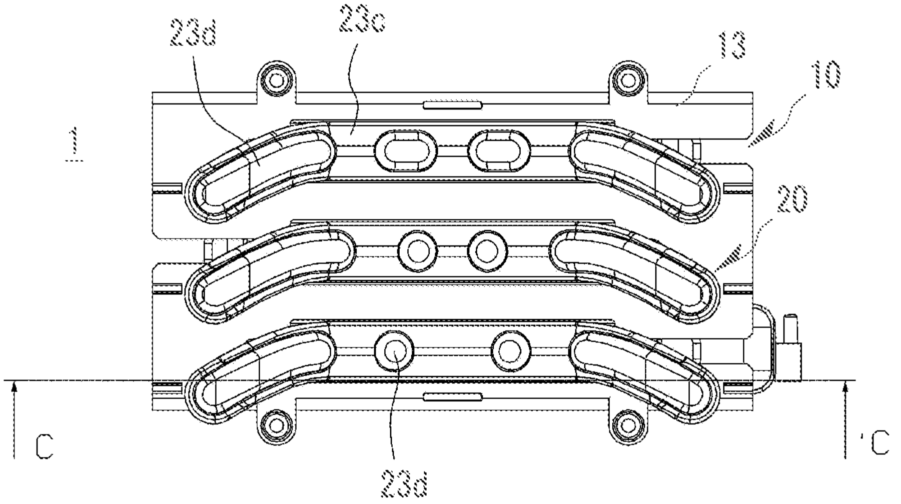
FIG. 12 is a plan view seen from the top of FIG. 7.
Figure 13:
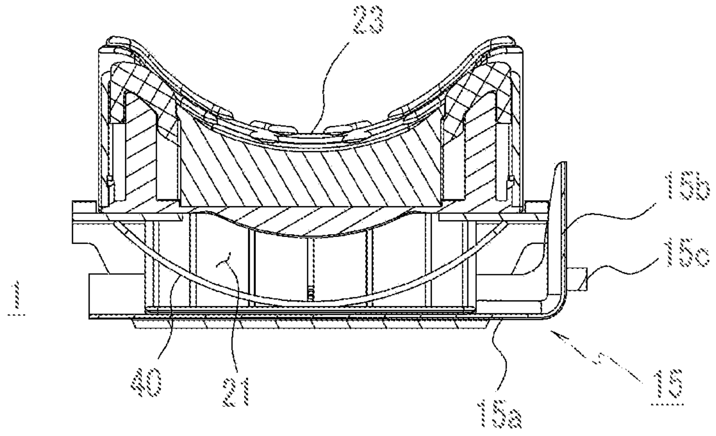
FIG. 13 is a cross-sectional view taken along the line C-C' of FIG. 12.

FIG. 12 is a plan view seen from the top of FIG. 7. FIG. 13 is a cross-sectional view taken along the line C-C' of FIG. 12. FIG. 12 illustrates the cylinder housing 10, the piston 20, the balance spring 40, and the airbag 15. The cylinder housing 10 is configured by the body 11 which is provided in a rectangular shape and includes a plurality of chambers 12 for accommodating the airbag 15 and the cover plate 13 which includes an assembly hole 13*b* in a cross direction to shield an open top surface of the body 11 and a slit 13*a* through which the ascending/descending plate unit 21 of the piston 20 passes at one side of the assembly hole 13*b*. The piston 20 is configured by the ascending/descending plate unit 21 which is accommodated in the chamber 12 of the cylinder housing 10 to ascend and descend in association with expansion and contraction force of the airbag 15 and the pressurization plate unit 23 which is integrally provided above the ascending/descending plate unit 21 to be located above the cover plate 13 to interwork with the ascending/descending. The balance spring 40 which is hooked to a lower center of the side surface of the ascending/descending plate unit 21 which configures the piston through one end and has upwardly curved both ends to be supported by the bottom surface of the cover plate to apply an elastic support force downwardly to the piston 20. The airbag 15 is configured by an expansion bag unit 15*a* which is provided in the chamber 12 to expand with an pneumatic pressure supplied from the outside to be in contact with the bottom surface of the ascending/descending plate unit 21 in a wide area to apply the expansion force, a reinforcing bag unit 15*b* which is connected to one side of the expansion bag unit 15*a* with a foldable structure to be folded vertically from the outside of the chamber 12, and a nozzle 15*c* which is connected to the reinforcing bag unit 15*b* to serve as a connection port to inject and discharge air from the outside.

Figure 14:
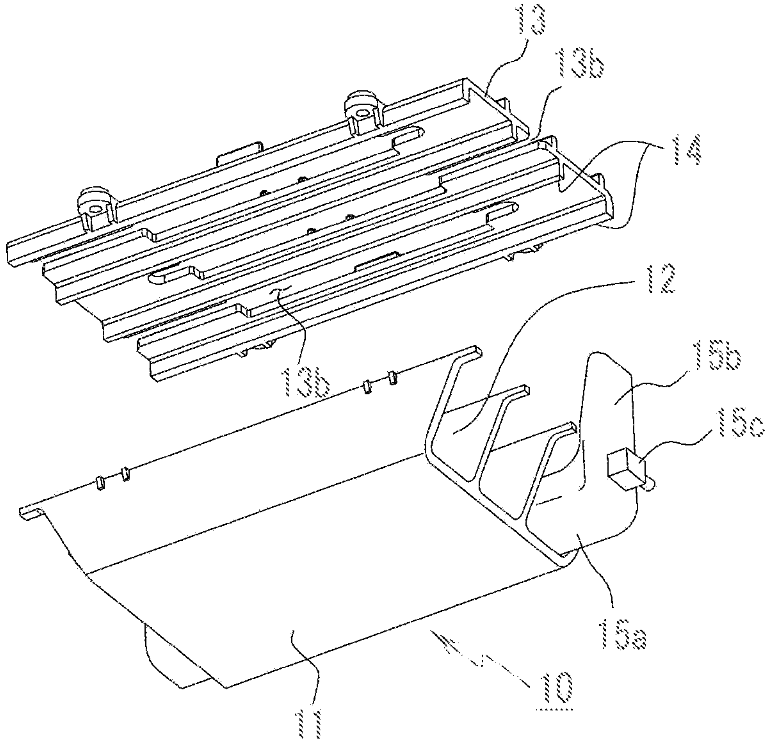
FIGS. 14 and 15 are exploded perspective views for explaining a configuration of a cylinder housing of FIG. 15.
Figure 15:
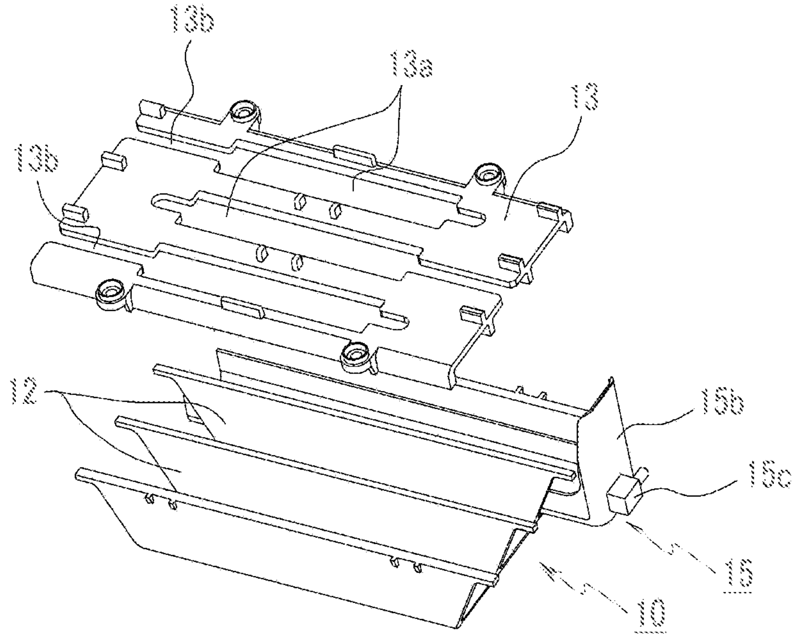

FIGS. 14 and 15 are exploded perspective views for explaining a configuration of a cylinder housing of FIG. 15. In the drawing, the body 11 includes a plurality of trapezoidal chambers 12 and has a top surface and both side surfaces which are open. In the cover plate 13 which is a plate shape member assembled on an open top surface of the body 11, a passage hole forms a slit 13*a* to allow one end of the piston 20 to move therethrough. The assembly hoe 13*b* is connected to the slit in the cross direction to assemble the piston 20 on the side surface. On the bottom surface, a rail 14 protrudes on the bottom surface to displace both ends of the balance spring 40 only in an elastic displacement direction, but suppress the movement in the width direction to maintain the ascending/descending support force with respect to the piston 20. The airbag 15 is accommodated in the chamber 12 to apply the ascending/descending force to the piston and includes the expansion bag unit 15*a* and the reinforcing bag unit 15*b* including the nozzle 15*c*.

Figure 16:
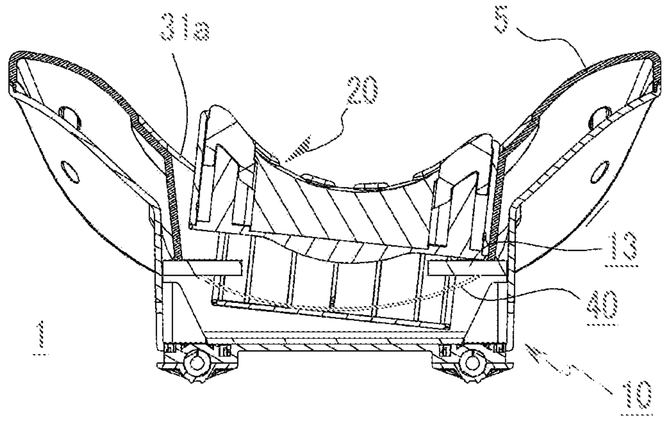
FIGS. 16 and 17 are views for explaining a modified example of the present invention.
Figure 17:
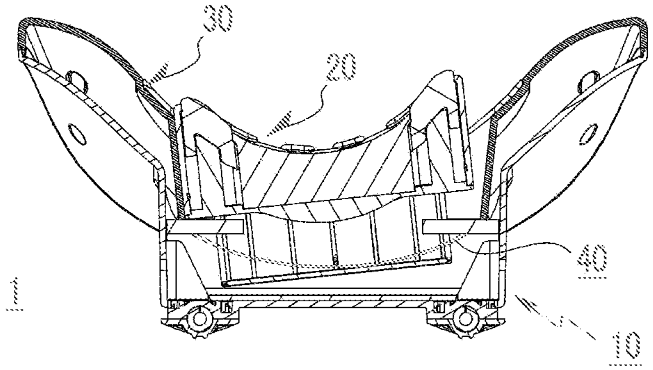

FIGS. 16 and 17 are views for explaining a modified example of the present invention. In this exemplary embodiment, the size of the entry hole 31*a* formed in the seating unit 31 which configures the top housing 30 is formed to ascend/descend the piston 20 to be inclined to the right side or the left side. Even though it is not illustrated in the drawing, the airbags 15 may be configured on the left and right sides of the drawing below the piston 20. If the left airbag, between the airbags 15 disposed on the left and right sides, selectively expands, as illustrated in FIG. 16, the left side of the piston 20 ascends and the right side descends. If the right airbag selectively expands, as illustrated in FIG. 17, the left side of the piston 20 descends and the right side ascends.

In the exemplary embodiment, the pressurization plate unit 23 which configures an upper portion of the piston 20 ascends and descends in a slidably surface-contact with the guide surface 32 which is vertically formed along the edge of the entry hole 31*a* of the seating unit 31 to assign a stability of the ascending/descending operation. Specifically, a lower center portion of the balance spring 40 uniformly applies the elastic support force downwardly regardless of the inclination of the piston 20 so that consequently, when the piston 20 ascends or descends, it is possible to suppress the generation of flow due to shaking or vibration caused by irregular expansion of the airbag 15 and other factors.

Figure 18:
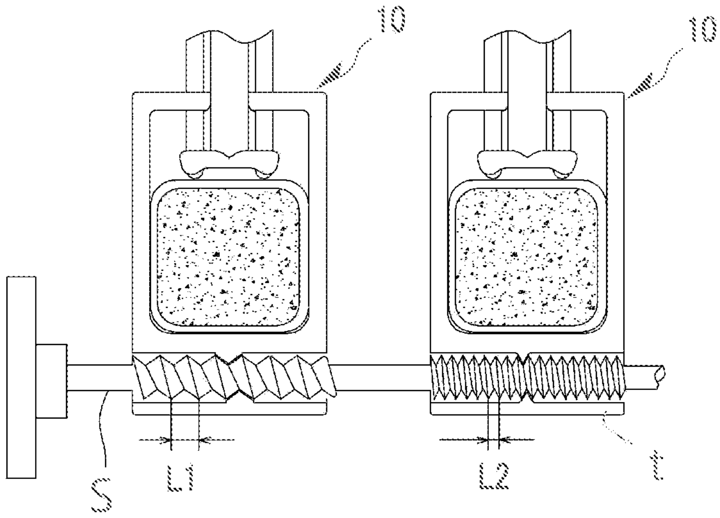
FIG. 18 is a view illustrating an example of adjusting an interval between cylinder housings of the present invention.

FIG. 18 is a view illustrating an example of adjusting an interval between cylinder housings of the present invention. In the drawings, the cylinder housings 10 are disposed at the left and right sides and the cylinder housings 10 are provided to adjust the interval therebetween. To this end, various known techniques may be applied.

In the present invention, as a preferable exemplary embodiment, a slide tray t is provided to guide the movement to be close to each other or spaced apart from each other in a state in which a plurality of cylinder housings 10 is disposed in parallel, and is coupled to one end of the cylinder housing 10 by the screw-fastening to rotate in the clockwise direction or counterclockwise direction to move the plurality of cylinder housings 10 along the spiral direction. At this time, each end of the adjustment screw S forms a differential spiral pitches L1 and L2 to be screwed with each cylinder housing 10 so that even though the adjustment screw S rotates in clockwise direction or counterclockwise direction by a predetermined angle, a movement amount of the cylinder housings 10 may be different.

As described above, according to the present invention, the interval adjustment unit is provided to compensate that if the user's height is long, the interval between spines is relatively wide, but if the user's height is short, the interval between spines is relatively narrow.

Figure 19:
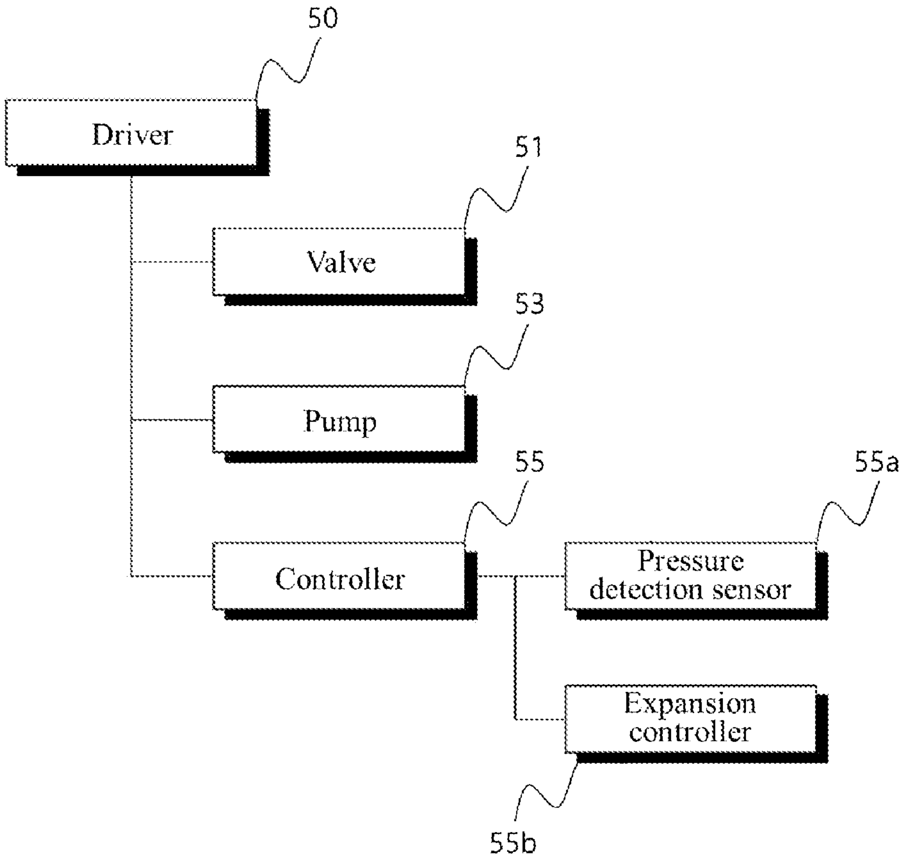
FIG. 19 is a block diagram for explaining a configuration of a driver of the present invention.

FIG. 19 is a block diagram for explaining a configuration of a driver 50 according to the present invention.

In the drawing, configurations of a valve 51 which is installed on a pipe connected to the nozzle 15*c* of the airbag 15 to open and close the pipe by a control signal in order to inject and discharge air from the airbag 15, a pump 53 which generates and supplies a pneumatic pressure to the valve 51, and a controller 55 which applies a control signal to the valve 51 and the pump 53 to control an operation are illustrated.

Hereinafter, a configuration of a piston acupressure device for a spinal massage according to the present invention will be described with reference to the drawings. The piston acupressure device 1 for a spinal massage according to the present invention is mainly configured by a cylinder housing 10 which is a fixing member, a piston 20 which is a movable member provided in the cylinder housing 10 to perform an ascending/descending operation, a top housing which supports an upper end of the piston 20, a balance spring 40 which stably maintains a balance of the ascending/descending operation of the piston 20 and applies a descending elastic support force to the piston 20, and a driver 50 which supplies and discharges the air for the ascending/descending operation of the piston 20.

The cylinder housing 10 is mainly configured by a body 11 which forms an entire shape and a cover plate 13 which is assembled on an open top surface of the body 11 or integrally molded.

The body 11 includes a trapezoidal chamber 12 in which the airbag 15 is accommodated and top surface and both sides are open, and the wide is increased from the lower portion to the upper portion.

The cover plate 13 shields the open top surface of the chamber 12 of the body 11 and forms a slit 13*a* in the width direction to allow the ascending/descending plate unit 21 which configures the piston 20 to be described below to be inserted and pass therethrough. The slit 13*a* includes an assembly hole 13*b* on one side and the piston 20 is inserted from the side portion of the chamber 12 through the assembly hone 13*b*. The cover plate 13 has rails 14 which protrude on the bottom surface with an interval and both ends of the U-shaped curved balance spring 40 with a concave center portion are slidably fitted between the rails 14. The rail guides the both ends of the balance spring 40 to move in a elastically displacement direction in a slidably fitted state to both ends of the balance spring, but suppresses the movement in the thickness direction of the piston 20.

In the meantime, in the present disclosure, the cylinder housing 10 is provided to have only one chamber 12, or provided to have a plurality of chambers, desirably 2 to 7 chambers 12 as illustrated in the drawing. When a plurality of chambers 12 is configured, the chambers 12 are divided by the partitions and the cover plate 13 forms an assembly hole 13*b* to assemble the piston 20 to be fitted to the side surface in the cross direction to the adjacent chamber 12.

Further, the airbag 15 accommodated in the chamber 12 is mainly configured by the expansion bag unit 15*a* which broadly applies an expansion pressure to the bottom surface of the ascending/descending plate unit 21 and a reinforcement unit 15*b* which is connected to one side of the expansion back unit to be folded to be connected to a nozzle 15*c* to inject and discharge the air from the outside. Here, the expansion bag unit 15*a* substantially expands by air injection to float the piston 20 in contact with the flat surface 21*a* of the piston 20 and the reinforcing back unit 15*b* is a part which connects the nozzle 15*c* and is vertically folded while protruding to the outside of the chamber 12. With this structure, the nozzle 15*c* is located at the outside of the chamber 12.

The piston 20 is a movable member which is located in the chamber 12 to pass through the slit 13*a* to ascend and descend and is configured by the ascending/descending plate unit 21 which ascends/descends in association with expansion and contraction operation of the airbag 15 and the operation plate 41 which is integrally provided above the ascending/descending plate unit 21 to pressurize the spine with the top surface during the upward movement.

The ascending/descending plate unit 21 is configured with a flat surface 21*a* which includes a flat bottom surface to be in surface contact with the top surface of the airbag 15, a lower frame 21*b* which extends from the flat surface 21*a* with a thickness which is upwardly reduced, and a hook 21*c* which protrudes from a lower center portion of the front and rear surfaces of the lower frame 21 to allow a center portion of the balance spring 40 to be described below to be caught.

The pressurization plate unit 23 is an element which has an expanded volume on the upper portion of the lower frame 21*b* and is exposed to an upper portion of the cover plate 13, that is, the outside of the chamber. The pressurization plate unit forms one or more guide rails 23*e* in a direction perpendicular to the front and rear surfaces to be slidably fitted into the guide hole 31*b* corresponding to the top housing 30. The pressurization plate unit 23 is configured by the upper frame 23*a* connected to the upper portion of the lower frame 21*b*, a case 23*b* which covers an outside of the insert and has a top surface to form a spine seating curve in which a center portion is concavely curved to seat the spine of the human body, and an acupressure plate 23*c* which forms a plurality of acupressure protrusions 23*d* which is fitted to the upper portion of the case 23*b* or integrally protrudes by the insert injection to apply acupressure to both muscles of the spine.

Like the cylinder housing 10, the top housing 30 is a fixing member and is coupled to the cylinder housing 10 with various components or integrally assembled with the cylinder housing 10. The present invention proposes a structure which is integrally coupled by the top case 5 and the bottom case 7. The top housing 30 is an element which prevents the movement and enables the stable operation when the pressurization plate unit 23 which is an upper end portion of the piston 20 ascends or descends and includes a seating unit 31 in which an entry hole 31*a* through which the pressurization plate unit 23 passes. On the edge of the entry hole 31*a*, a guide surface which is slidably surface-contact with the outer surface of the pressurization plate unit 23 which configures the piston 20 even in a state in which the piston 20 fully descends in a direction perpendicular to the edge is formed.

The balance spring 40 is a return element that has one end supported on the cylinder housing 10 or the top housing 30 and the other end supported on one side of the piston 20 to apply a downward elastic force. The balance spring 40 is provided in various forms. In the present invention, as a preferable exemplary embodiment, one end of the balance spring is caught to the hook 21*c* which protrudes from the lower center portion of the side surface of the lower frame 21*b* which configures the ascending/descending plate unit 21. Both ends are symmetrically upwardly curved with respect to one end to be supported by the bottom surface of the cover plate 13. With this configuration, the downward elastic force is applied to the piston 20 which ascends.

Referring to the drawing, the balance spring 40 is configured by an insertion groove 42 which has a width and an area to allow the ascending/descending plate unit 21 to be inserted and pass through, one pair of elastic displacement units 41 which has a U shape and is disposed at front and rear sides of the insertion groove 42 to be located on a front and rear surfaces of the piston 20, and a connection unit 43 which connects both ends of one pair of elastic displacement units 41 to form a closed curve. The balance spring 40 may be provided as a leaf spring or a steel wire spring formed by bending a steel wire.

In the meantime, in the present invention, the balance spring 40 is proposed such that one end is caught to a lower center of the lower frame 21*b* which configures the piston 20 and both ends are supported by both sides of the bottom surface of the cover plate 13 to slidably guide in an elastic displacement direction and the movement is suppressed in the front and rear direction. In addition, as long as the downward support force is applied to the piston 20, various shapes may be provided.

For example, it is not illustrated in the drawing, a lower end of the side surface of the pressurization plate unit 23 is caught and both ends are upwardly curved with respect to the lower end to be supported by one side of the bottom surface of the top housing to apply the downward elastic force to the ascending piston 20. At this time, the balance spring is configured by the insertion groove having a size to allow the pressurization plate unit 23 to be inserted and pass therethrough, one pair of elastic displacement units with a U shape which is disposed in the front and rear sides with respect to the insertion groove, a connection unit which connects both ends of one pair of elastic displacement units to form a closed curve and uses any one of the leaf spring and the steel wire spring formed by bending the steel wire.

As another exemplary embodiment, in addition to the leaf spring and the steel wire spring formed by bending the steel wire, a coil spring is also used. At this time, a plurality of coil springs may be disposed so that one end is supported by the ascending/descending plate unit 21 or one side therebelow and the other end is supported by the chamber 12 of the lower one side of the top housing 30 to apply the downward support force to the piston 20.

In the meantime, the acupressure protrusion 23*d* may include any one or both a vibration motor (not illustrated) which is supplied with the power to generate vibration when the piston 20 ascends and a thermal heater which is supplied with the power to generate heat. By doing this, the massage effect is increased by vibration and the thermal heating operation as well as the acupressure operation by the pressurization pressure of the piston 20.

The driver 50 includes a valve 51 which is connected to the airbag 15 to control the air supply and discharging, a pump 53 which is supplied with the power to selectively generate a pneumatic pressure, and a controller 55 which controls operations of the valve 51 and the pump 53.

The valve 51 is installed on a pipe connected to the nozzle 15*c* of the airbag 15 to supply or discharge the pneumatic pressure and is connected to the controller 55 to receive a control signal to perform an open/close operation. As the valve 51, a known solenoid valve may be used.

The pump 53 uses a compressor which is supplied with a power from the outside to generate a pneumatic pressure and similarly, is connected to the controller 55 to be selectively applied with the control signal to be controlled to generate or stop the pneumatic pressure.

The controller 55 is a control element which applies the control signal to the valve 51 and the pump 53 and is connected to a manipulation pad configured by a plurality of buttons or switches to receive a manipulation force from the user to output a control signal. The controller may be provided in various forms and may be provided in the form of a wired or wireless remote controller or configured to be controlled through communication, such as Bluetooth, Wi-Fi, WiBro, or NFC, with a smartphone or computer. The controller 55 is configured by a pressure detection sensor 55*a* which detects an expansion pressure of the airbag 15 and an expansion controller 55*b* which is connected to the pressure detection sensor 55*a* to compare a predetermined set value and a pressure value in the airbag 15 to apply a control signal to the pump 53 and the valve 51 to maintain the pressure value within a set value range.

In the meantime, in the present disclosure, a plurality of cylinder housings 10 is configured to adjust the interval therebetween. This is because the interval between the spines may be narrow or wide depending on the height of the user so that the interval of the cylinder housings 10 is adjusted in accordance with the interval of the spines.

To this end, in the present invention, as a preferable exemplary embodiment, as illustrated in FIG. 18, a slide tray t which guides the plurality of cylinder housings 10 to be close to each other or spaced apart from each other in a state and an adjustment screw s which is coupled to one end of each cylinder housing 10 by the screw-fastening to rotate in the clockwise direction or counterclockwise direction to move the plurality of cylinder housings 10 along the spiral direction. Specifically, different differential spiral pitches L1 and L2 are formed in the adjustment screw S and the cylinder housing 10 is screwed to the differential spiral pitches L1 and L2.

With this configuration, when the adjustment screw S rotates by a predetermined angle in a clockwise direction or a counterclockwise direction, each cylinder housing 10 moves along the differential spiral pitches L1 and L2 in which different spiral pitches are formed so that a displacement amount of each cylinder housing is different.

In the meantime, the adjustment screw may also be configured to be connected to a driving motor to adjust the interval of the cylinder housings 10 by means of user's switch manipulation.

Even though it is not illustrated as another exemplary embodiment, two or ten cylinder housings 10 are configured to include a guide tray (not illustrated) in which cylinder housing 10 is slidably seated and a fixing screw which is screwed to one side of the guide tray to selectively pressurize the cylinder housing through the end to restrain the position, to adjust the interval therebetween. With this configuration, the user may move the cylinder housing 10 and then fix the position using the fixing screw.

The present invention is not limited to the exemplary embodiments described herein, and may be employed by changing a part to which the exemplary embodiment is applied, and it would be appreciated by those skilled in the art that various changes and modifications might be made to these embodiments without departing from the spirit and the scope of the invention. Therefore, such changes and modifications may be considered to belong to the claims of the present invention.

The invention claimed is:

1. A piston acupressure device for a spinal massager, comprising:

a cylinder housing which is configured by a chamber with an open top surface to accommodate an airbag therein and a cover plate which forms a slit in a width direction by shielding a top surface of the chamber;

a piston which is configured by an ascending/descending plate unit which is located in the chamber to pass through the slit to be ascended or descended by the airbag and a pressurization plate unit which extends to an upper portion of the ascending/descending plate unit to pressurize the spine through the top surface when ascending;

a top housing which has an end connected to the cylinder housing to guide and support the pressurization plate unit of the piston and includes a guide surface which is slidably surface-contact even in a state in which an edge of an entry hole through which the pressurization plate unit passes vertically extends so that the pressurization plate unit fully descends;

a balance spring which has one end supported by the cylinder housing or the top housing and the other end supported by one side of the piston to apply a downward elastic force; and a driver which is configured by a valve which is connected to the airbag to regulate the supplying and discharging of the air, a pump which generates a pneumatic pressure, and a controller which controls the valve and the pump.

2. The piston acupressure device for a spinal massager according to claim 1, wherein the cylinder housing is configured by a body having a trapezoidal chamber in which both side surfaces are open and a width is upwardly increased; and the cover plate which is provided to cover an open top surface of the body and forms an assembly hole to insert the ascending/descending plate unit from the side surface and is connected to an assembly groove to allow the ascending/descending plate unit to pass through.

3. The piston acupressure device for a spinal massager according to claim 2, wherein the cylinder housing includes:

the body having the trapezoidal chamber in which a top surface and both side surfaces are open and the width is increased from a lower portion to an upper portion;

the cover plate which is provided to shield the open top surface of the body and forms the slit which has a width smaller than the chamber in a width direction and allows the ascending/descending plate unit to move in and out; and a rail which protrudes on a bottom surface of the cover plate with an interval to allow a movement in a spring displacement direction, but suppress the movement in the width direction by allowing both ends of a U shaped balance spring in which a center portion is concavely curved to be slidably fitted therebetween.

4. The piston acupressure device for a spinal massager according to claim 1, wherein the cylinder housing has a cylindrical shape with an open upper surface, and has 2 to 7 chambers partitioned by partition walls therein and is configured by a body having a trapezoidal chamber in which both side surfaces are open and a width is upwardly increased; an assembly hole which is provided on the open top surface of the body and inserts the piston in an intersecting direction with an adjacent chamber from a side surface; and a cover plate which is connected to the assembly hole to form a slit which is a hole through which the ascending/descending plate unit passes.

5. The piston acupressure device for a spinal massager according to claim 1, wherein the balance spring which has one end caught to a center portion of a side load of the ascending/descending plate unit and both ends which are upwardly curved with respect to one end to be supported by a bottom surface of the cover plate to apply the downward elastic force to the ascending piston and is configured by an insertion groove having a size to allow the ascending/descending plate unit to be inserted and pass therethrough, one pair of elastic displacement units with a U shape which is disposed in the front and rear sides with respect to the insertion groove, and a connection unit which connects both ends of the elastic displacement units to form a closed curve, is any one of a leaf spring or a steel wire spring formed by bending a steel wire.

6. The piston acupressure device for a spinal massager according to claim 1, wherein the balance spring has one end caught to a center portion of a side surface of the pressurization plate unit and both ends which are upwardly curved with respect to one end to be supported by a bottom surface of the top housing to apply the downward elastic force to the ascending piston and is configured by an insertion groove having a size to allow the pressurization plate unit to be inserted and pass therethrough, one pair of elastic displacement units with a U shape which is disposed in the front and rear sides with respect to the insertion groove, and a connection unit which connects both ends of the elastic displacement units to form a closed curve, is any one of a leaf spring or a steel wire spring formed by bending a steel wire.

7. The piston acupressure device for a spinal massager according to claim 1, wherein the balance spring is a plurality of coil springs which has one end supported at one side of the ascending/descending plate unit and the other end supported at one side of the bottom surface of the chamber or the top housing to apply a downward support force to the piston.

8. The piston acupressure device for a spinal massager according to claim 1, wherein the airbag is configured by an expansion bag unit which is in contact with the bottom surface of the ascending/descending plate unit to apply an expansion force; and a reinforcement bag unit which is connected to one side of the expansion bag unit to be folded to be connected to a nozzle to inject or discharge an air from and to the outside.

9. The piston acupressure device for a spinal massager according to claim 1, wherein the controller includes:

a pressure detection sensor which detects an expansion pressure of the airbag; and an expansion control unit which is connected to the pressure detection sensor to compare a predetermined set value to apply a control signal to a pump and a valve to maintain within the set value range.

10. The piston acupressure device for a spinal massager according to claim 1, wherein the ascending/descending plate unit is configured by a flat surface which forms a bottom surface to be flat to be surface-contact with the top surface of the airbag, a lower frame which extends to an upper portion from the flat surface with a reduced thickness, and a hook which protrudes from a center lower portion of the front and rear surfaces of the lower frame to allow a center portion of the balance spring to be caught, the pressurization plate unit is configured by an upper frame which is located above the cover plate with an expanded volume above the lower frame, forms one or more guide rails in a direction perpendicular to the front and rear surfaces to be slidably fitted into a guide hole corresponding to the top housing, and extends to an upper portion of the lower frame, a case which covers an outside of the upper frame and has a top surface to form a spine seating curve in which a center portion is concavely curved to seat the spine of the human body, and an acupressure plate which forms a plurality of acupressure protrusions which is fitted to the upper portion of the case or integrally protrudes by the insert injection to apply acupressure to both muscles of the spine.

11. The piston acupressure device for a spinal massager according to claim 10, wherein each acupressure protrusion is configured to include any one or both a vibration motor which is supplied with a power to generate a vibration or a thermal heater which is supplied with a power to generate heat.

12. The piston acupressure device for a spinal massager according to claim 1, wherein a plurality of cylinder housings is configured to two to seven to adjust an interval therebetween and the cylinder housings are configured by a slide tray which guides the movement to a direction for adjusting an interval in a state in which the plurality of cylinder housings is disposed in parallel; and an adjustment screw which is inserted and passes into one end of each cylinder housing by screw-fastening to be screwed to each cylinder housing with a pitch which is gradually increased or decreased.

13. The piston acupressure device for a spinal massager according to claim 1, wherein a plurality of cylinder housings is configured to two to ten to adjust an interval therebetween and is configured by a guide tray in which each cylinder housing is slidably seated and a fixing screw which is screwed to one side of the guide tray to selectively pressurize each cylinder housing through the end to restrain the position.

* * * * *